Feb. 8, 1944.   O. L. GARRETSON   2,340,954
APPARATUS FOR TESTING AIRCRAFT ENGINES
Filed May 4, 1942   2 Sheets-Sheet 2

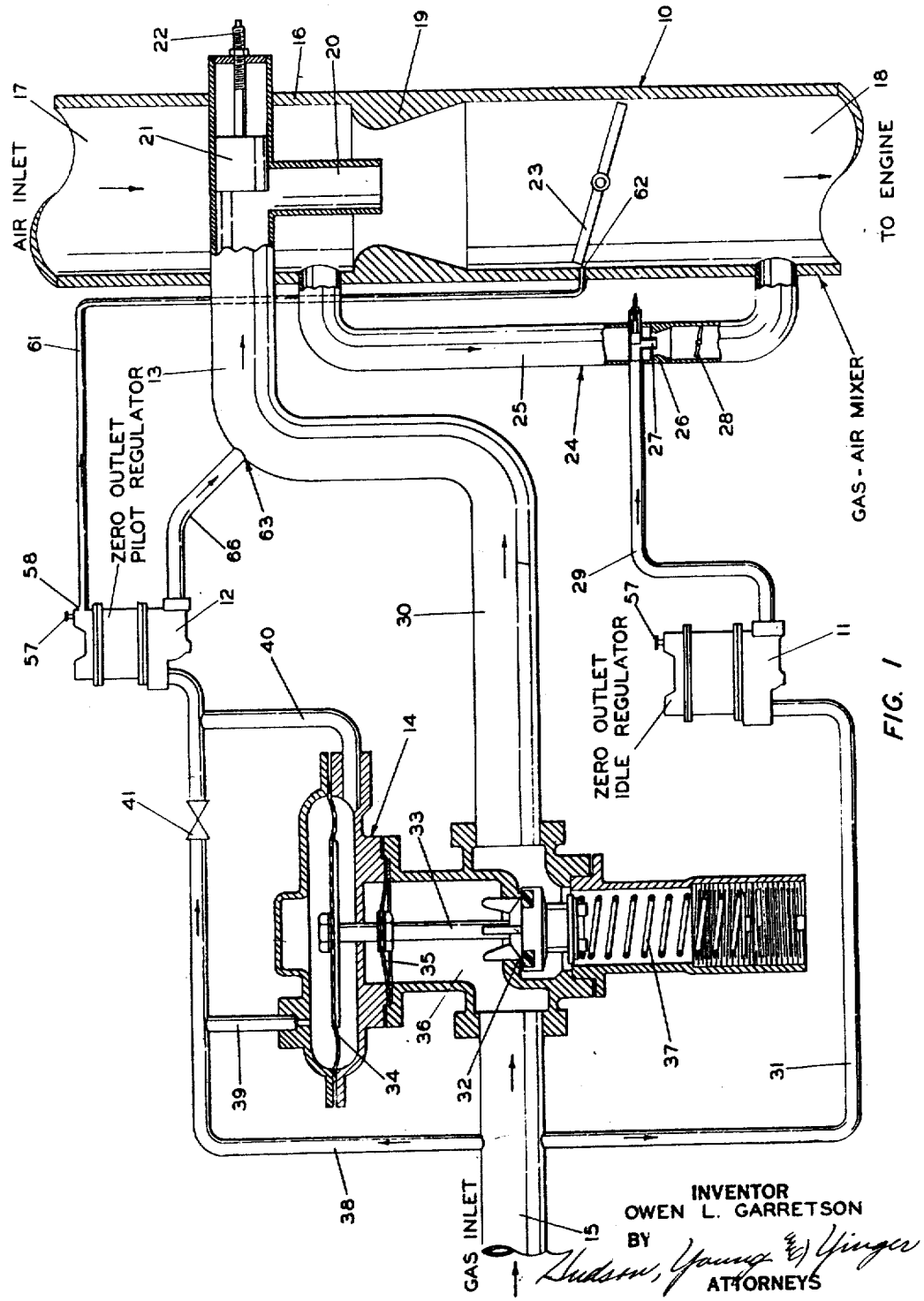

INVENTOR
OWEN L. GARRETSON
BY
ATTORNEYS

Patented Feb. 8, 1944

2,340,954

UNITED STATES PATENT OFFICE 2,340,954

APPARATUS FOR TESTING AIRCRAFT ENGINES

Owen L. Garretson, Bartlesville, Okla., assignor to Phillips Petroleum Company, a corporation of Delaware Application May 4, 1942, Serial No. 441,711

4 Claims. (Cl. 48—180)

My invention relates to testing apparatus for internal combustion engines.

More particularly, my invention resides in an improved apparatus for operating gasoline engines on a gaseous fuel for block testing and running-in purposes, and my invention has particular utility in connection with the utilization of propane vapor as running-in fuel for large high-compression aircraft engines. It is standard practice to give such engines a somewhat extended run under load in the factory, after which the engines are torn down, inspected, reassembled and given a final or "acceptance" test at full rated horsepower just prior to delivery to the purchaser.

Due to the requirement of a high octane fuel for safe operation of the engines, it has heretofore been considered necessary to make these factory test runs on the same high grade (and expensive) aviation fuel which the engines utilize in regular service operation. My invention makes possible the use of propane (or other liquefied petroleum gases) for the test work. The system may be utilized for the carburetion of natural gas or any other gaseous fuel. Propane is relatively cheap and abundant, and has an anti-knock characteristic which is more than adequate for the purpose in question. By means of the apparatus herein disclosed, the operation of the engines on propane need not involve alteration of the engine in any way; the propane operation will not even require removal of the gasoline carburetor equipment normally supplied with the engine. My apparatus is simple in operation and can be built at a nominal cost; yet it will provide extremely delicate control of the fuel mixture over the whole range of engine operation.

The primary object of my invention is to make possible the use of a cheap and abundant fuel for engine testing where the use of premium fuels has heretofore been necessary.

A specific object of my invention is to provide apparatus whereby testing of gasoline engines may be done with propane or other gaseous fuel without in any way disturbing the engine or gasoline carburetor assemblies.

It is further my object to provide for extremely accurate control of an air-gas testing fuel charge throughout the operating range of a large high-performance engine.

It is a further object of my arrangement to provide for a large capacity fuel system which has the advantages which are characteristic of relatively smaller capcity control units, with regard to sensitivity and accuracy.

Other objects and advantages are easily discernible in my following specification, in which:

In the drawings,

Figure 1 is a diagrammatic view, partly in section, illustrating the principle and mode of operation of my apparatus.

Figure 3:
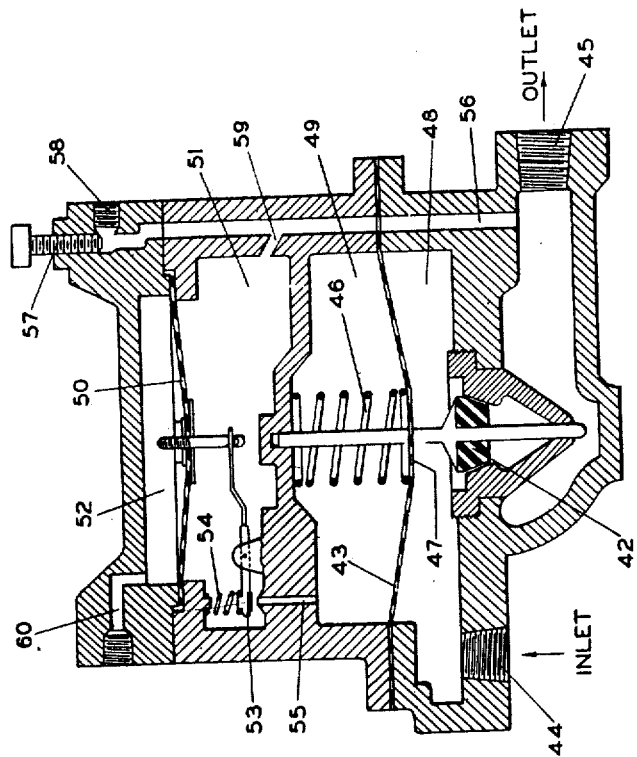
Figure 3 is an enlarged sectional view of one of the elements of Figure 1, and is helpful to illustrate the operation thereof.

Referring now to Figure 1, the numeral 10 refers to a gas-air mixer, having certain novel particulars which will later be described in detail. This mixer is adapted to be temporarily attached to an engine carburetor or manifold for testing purposes. Connection to the engine may be made in any manner suitable to the particular situation, such as by a tubular split sleeve and clamp band, by a rubber hose slip-connection, etc. A zero regulator 11 feeds starting and idling fuel to the mixer and another zero regulator 12 feeds the main fuel inlet 13 of the mixer. A pilot-operated type control valve 14 also is connected to the main fuel conduit. The whole system is connected to a source of fuel at the point 15.

With further reference to the gas-air mixer 10, this unit is composed of a tubular wall 16, forming an air intake 17 and a mixture discharge 18. Located intermediately of the intake and discharge ends of the mixer tube is a Venturi section 19, with a fuel nozzle 20 disposed therein. The fuel nozzle is in effect an extended portion of the fuel conduit 13, and is provided with an adjustable element 21 with adjusting gear 22, by which means the fuel inlet may be restricted in any desired degree. A main throttle plate 23 is provided to control the flow of air through the mixer.

On the side of the mixer tube, by-passing the main venturi and throttle, is provided an auxiliary mixer 24. This auxiliary fuel circuit has the same general form and includes the same organization of elements as in the case of the main mixer 10. The major elements are the tube 25, venturi 26, nozzle 27 and throttle 28. The nozzle 27 forms an extension of the conduit 29 which leads from the outlet of regulator 11.

Considering for the moment only the mixers 10 and 24, the operation is as follows:

Having the mixer discharge 18 connected to the engine, and assuming that conduits 13 and 29 are supplied with a fuel vapor (such as propane) at approximately atmospheric pressure the engine is cranked with throttle 23 completely closed and throttle 28 opened. Air is drawn through venturi 26 via intake 17 and tube 25. Since venturi 26 is small, even very slow cranking of a large engine will induce a high velocity flow therethrough, and an appreciable suction will be imposed upon nozzle 27, thus inducing a flow of fuel gas from line 29. Upon ignition of this small fuel charge in the cylinders, the speed of the engine may be reduced or increased within narrow limits by manipulation of throttle 28. This small auxiliary mixer or carburetor is to have a capacity great enough for approximately 5 to 10% of the full rated horsepower of the engine, and is entirely for the purpose of obtaining good mixture formation and control at the starting and idling conditions.

For any greater engine speed or power output, operation of the engine is taken over by the main portion of the carburetor 10. The air velocity at the upper capacity limit of the starting mixer 24 is great enough to render nozzle 20 operative as the main throttle 23 is opened. This throttle then operates in the usual manner to control the engine above the power and speed range afforded by the auxiliary section 24. Fuel is introduced through line 13, and the mixture or air-fuel ratio may be adjusted by means of the movable restricting member 21.

Having covered the structure and operation of the mixers as such, a further description of the gas system leading up to the mixers will reveal the nature of the over-all operation of my carbureting device. Still referring to Figure 1, the control valve 14 is located in the main fuel line 30, of which 15 is the inlet and 13 is a continuation. A small line 31 by-passes the control valve, and serves the idle fuel circuit independently.

The control valve 14 is of standard design, and is well known as such to the gas control art. Its principal features consist of a throughway containing a valve 32, connected by means such as the stem 33 to a large control diaphragm 34. A small seal diaphragm 35 prevents pressure in the chamber 36 from reaching the under side of diaphragm 34. A spring 37 normally loads the valve 32 in a closing direction. The top side of diaphragm 34 is subjected to the line or inlet pressure in line 38, through the branch pressure line 39. The lower side of diaphragm 34 is subjected to the pressure existing at a point further downstream in line 38, through the branch pressure line 40. At a point in line 38, between junctures of lines 39 and 40, I provide an adjustable needle valve 41.

In operation, the needle valve 41 may be adjusted so as to begin actuation of the diaphragm control valve at any desired rate of flow through line 38. For example, in a particular application of my device, I adjust the valve 41 so as to provide a differential of 1 pound per square inch across it at a flow rate of 300 cubic feet. It is obvious in Figure 1 that any differential existing across valve 41 will be registered upon diaphragm 34, tending to open valve 32. With a given relationship existing between the loading of spring 37 and the area of diaphragm 34, the 1 pound per square inch differential across the needle valve and diaphragm will be sufficient to begin opening of valve 32. Beyond the initial opening of this valve, further opening will be had in proportion to the increase of flow through line 38.

With respect to the operation of the testing system, the above outlined arrangement permits of operation on the small zero regulator 12 up to a desired point in the speed range, above which the control valve 14 supplies the additional fuel necessary for engine operations. The particular advantage and utility of this arrangement lies in the provision of a small, sensitive zero governor for fuel control within the lower portion of the engine horsepower curve, and in the utilization of the same small and sensitive device to render accurate control over the large valve 14 for extended power operation.

The zero governors 11 and 12 are of a type which is at present commercially available. A brief description is nevertheless given here to further illustrate the operation of these units as it relates to the operation of the whole system. Referring to Figure 3, the main valve 42 is operated by a diaphragm 43. This valve controls the main flow of gas from inlet 44 to outlet 45. The diaphragm is loaded by a spring 46, and has a small bleed hole 47 communicating between chambers 48 and 49. A second diaphragm 50 divides an upper portion of the regulator into two chambers 51 and 52, and serves to control a pilot valve 53 which is loaded toward the closed position by a spring 54. This pilot valve cooperates with a channel 55 to provide a regulated communication between chambers 49 and 51. A channel 56 places the outlet 45 in communication with a needle valve 57, and outlet 58. Channel 56 also has access to chamber 51, through a port 59. A vent 60 communicates to the atmosphere, or preferably is connected back to the air inlet of the gas-air mixer 10.

In the operation of the structure, briefly explained above, a suction imposed on the outlet 45 will be registered on diaphragm 50 via channel 56 and port 59, opening pilot valve 53 to a degree proportionate to the amount of suction imposed. It is obvious that, prior to opening of valve 53, the pressure in chambers 48 and 49 will be equal, in view of the bleed hole 47. Thus diaphragm 43 is balanced and valve 42 will be held closed by spring 46. Immediately upon opening of valve 53, however, the pressure in chamber 49 will be lowered and vapor will flow through channels 55 and 56 to the outlet 45. Thus the diaphragm 43 will be unbalanced to the extent of the pressure differential produced across bleed hole 47. Valve 42 will be opened then in accordance with the degree of differential across the bleed hole. This pilot-controlled mode of operating valve 42 produces a very sensitive control of the pressure at outlet 45, within the capacity range of the device.

In regulator 11 of the diagram Figure 1, the additional outlet 58 is not utilized. This outlet may be closed off by needle valve 57, but a pipe plug may be screwed into the outlet for additional security against leakage. In the case of regulator 12 of Figure 1, however, the outlet 58 is connected by tubing 61 to a small port 62 in the wall of the mixer 10. This port is so located as to be at or just above the edge of throttle 23 when the latter is closed. Thus, when throttle 23 begins to open, the high degree of suction produced by high velocity flow at restricted throttle opening will be registered on chamber 51 and diaphragm 50, aiding in early opening of valves 53 and 42. At small degrees of throttle opening, the velocity through the main venturi 19 will be quite low. Hence, the suction on nozzle 20 will be of a small order, and except for the effect of high suction on port 62, the regulator 12 would be slow in opening until a moderate throttle opening had been reached.

Figure 2:
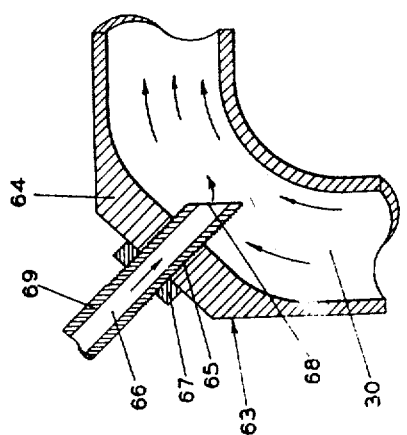
Figure 2 is a detailed view of a refinement which is desirable in the system of Figure 1.

Figure 2 is illustrative of a desirable refinement of value to the operation of my invention. This refinement relates to the juncture of gas conduit 30 with the outlet of regulator 12, which is shown in Figure 1 and generally indicated by the numeral 63. Referring now to Figure 2, the conduit 30 is thickened at the outer wall 64 and is drilled and tapped to provide a threaded opening 65. A tube 66 is threaded into the opening, and secured by a locknut 67. The inner end of tube 66 is cut at an angle, as at 68. The outer end of tube 66 is machined smooth so that connection thereto may be made by clamping a rubber hose over the smooth portion at 69.

In operation, the tube 66 may be adjustably positioned in the conduit 30 so that the beveled open end 68 will have any desired orientation with respect to the direction of flow through conduit 30. This angular orientation will affect the response characteristics of the piloting zero governor 12 and, therefore, of the control valve 14. This modification of characteristic is due to the velocity head effect in the gas stream. When the tube mouth 66 is facing in the direction shown in Figure 2, the velocity effect will produce the maximum pressure reduction on the outlet of governor 12. If faced in the opposite direction, the velocity head would have a ram effect, elevating the pressure in the tube 66. Between these two extremes, any desired effect can be obtained, and when the opening is located half way between the limiting positions, the velocity effect thereon will be zero.

Having described in some detail the various elements of my apparatus, I will now summarize the complete operation of my apparatus to illustrate how each element performs its part in arriving at the desired result. First, I wish to make the general observation that, as is well known in the art of gas control and proportioning, a small valve will give more accurate control at low flows than will a large one. Therefore, it is desirable to use small valves for small flows and to use large valves for control only where necessary because of a large total capacity being required.

Referring now to the summarized operation, which may be followed from Figure 1, starting and idling of the engines to be tested is secured by the structure 24, while all operation above these levels is carried on by the main large portion of mixer 10. Thus a venturi which is proportioned to suit the respective requirements of low and high speed operation is provided. In view of the approximately sized mixers, good control of the air-gas mixture is easily obtained throughout the range of speed and power.

Upon beginning of operation on the large or "power" section of the gas carburetor, control of the gas is at first obtained by operation of the port 62 and line 61, as previously explained. As opening of the main throttle 23 proceeds further, the velocity through venturi 19 becomes sufficient to take over the control function through suction imposed on the main nozzle 20. When the engine output reaches a considerable level, say from 20 to 30% of its maximum output, the flow in line 38 has reached a magnitude such that the differential produced across the needle valve 41 will actuate the control valve 14 to sustain substantially atmospheric pressure in the conduit 13. The desired gas-air ratio at any given point on the mixture curve (curve of mixture versus engine speed) may be established by means of the restriction 21. Having established the nominal mixture value, the shape fo the mixture curve may be modified by the feature illustrated in Figure 2 and previously described.

Thus, it is seen that extremely accurate metering of the fuel charge is provided throughout the speed and power range of the engine without further manual adjustment during operation. Ample capacity for large engines is afforded, without sacrificing accuracy and sensitivity at low speed operation of such engines. Only by providing this type of extremely accurate pressure and mixture control can the use of a vapor fuel (such as propane) be even considered for running-in tests of high performance aircraft engines, due to the exacting requirements and test procedures which are peculiar to the aircraft engine industry. This observation applies particularly to engines for use in military aircraft.

Taking the last statements above into consideration, the utility of my device in making the use of propane available to replace extra-premium gasolines for engine testing is self-evident.

While my foregoing specification defines a particular embodiment of my invention, it is understood that the same system could be adapted to a number of equivalent modifications within the scope of my appended claims. It is further understood that within the scope of this invention, whatever the specific structural form, it is immaterial whether the testing system is applied directly to the engine manifold, or to the air inlet of the gasoline service carburetor.

I claim:

1. A gaseous fuel system for testing airplane engines nomally requiring high octane number gasoline, comprising a main and a first tributary raw fuel conduit leading to a main gas-air mixer, a zero governor feeding fuel to said tributary conduit at substantially atmospheric pressure, and a control conduit associating a pilot operator in said zero governor with the throttling region of said mixer whereby a high degree of suction produced adjacent to the mixer throttle upon initial opening thereof is made operative to open said zero governor, a second tributary raw fuel conduit leading to a secondary gas air mixer, said secondary gas-air mixer terminating in the main gas-air mixer and on the downstream side of the throttling region of said main gas-air mixer, a zero idle regulator in said second tributary raw fuel conduit.

2. A gaseous fuel system and mixer for testing airplane engines normally requiring high octane number gasoline, comprising: a main gas-air mixer wherein a fuel charge is to be formed; a principal conduit for leading raw gas to the mixer; a diaphragm-controlled valve in said conduit; a first tributary gas conduit joining said principal conduit; a zero governor in said tributary conduit; an adjustable restriction in said tributary conduit, and means placing the diaphragm of said control valve in operative communication with the pressures existing on the respective sides of said restriction; a second tributary gas conduit joining said principal conduit and an auxiliary gas-air mixer, said auxiliary mixer communicating with the main gas-air mixer on the downstream side thereof, and a zero idling regulator in said second tributary raw fuel conduit.

3. In an apparatus for testing airplane engines normally requiring high octane number gasoline wherein gaseous fuel is used, a main and a first tributary raw gaseous fuel conduit leading to a main gas-air mixer, a valve in said main gas conduit, pressure responsive means connected with said valve, a zero governor in said first tributary conduit, a restriction in said first tributary conduit upstream of the zero governor, means placing said pressure responsive means in communication with the opposite sides of said restriction, the said first tributary conduit being connected with the main gas conduit upstream and downstream of said valve, a second tributary raw gaseous fuel conduit joining said principal conduit and an auxiliary gas-air mixer, said auxiliary gas-air mixer communicating with the main gas-air mixer on the downstream side thereof, and a zero idling regulator in said second tributary raw fuel conduit.

4. A gaseous fuel system for testing airplane engines normally requiring high octane number gasoline, comprising an air inlet tube, a main throttle valve, a venturi in the air inlet tube upstream of the main throttle valve, a main gaseous fuel inlet line extending through the wall of the air inlet tube on the upstream side of the venturi and extending into the throat of the venturi, an air by-pass conduit extending from a point intermediate the venturi and the point of entrance of the main gaseous fuel line into the air inlet tube to a point in the air inlet tube downstream of the main throttle valve and containing a secondary throttle valve, a diaphragm controlled valve in the main gaseous fuel line, said valve having a high pressure inlet and a low pressure outlet, a first tributary gas conduit joining the main gaseous fuel inlet conduit upstream and downstream of the said diaphragm controlled valve, a restriction in said tributary gas conduit, means placing the diaphragm of the diaphragm controlled valve in communication with the opposite sides of said restriction, a zero governor in said tributary conduit on the downstream side of said restriction, said zero governor being pressure responsive to the air inlet tube at the main throttle valve; a second tributary gas conduit joining the main gaseous fuel inlet conduit upstream of the diaphragm controlled valve and the by-pass upstream of the secondary throttle valve, and a zero governor in said secondary tributary gas conduit.

OWEN L. GARRETSON.